(12) United States Patent
Filsfils et al.

(10) Patent No.: US 9,832,110 B2
(45) Date of Patent: Nov. 28, 2017

(54) IDENTIFYING, TRANSLATING AND FILTERING SHARED RISK GROUPS IN COMMUNICATIONS NETWORKS

(71) Applicant: Cisco Technology, Inc., San Jose, CA (US)

(72) Inventors: Clarence Filsfils, Brussels (BE); George L. Swallow, Boston, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/197,971

(22) Filed: Jun. 30, 2016

(65) Prior Publication Data
US 2016/0308757 A1    Oct. 20, 2016

Related U.S. Application Data

(63) Continuation of application No. 14/155,640, filed on Jan. 15, 2014, now Pat. No. 9,385,945, which is a
(Continued)

(51) Int. Cl.
*H04L 12/703* (2013.01)
*H04L 12/707* (2013.01)
(Continued)

(52) U.S. Cl.
CPC .......... *H04L 45/28* (2013.01); *H04L 12/4645* (2013.01); *H04L 45/04* (2013.01); *H04L 45/22* (2013.01); *H04L 45/66* (2013.01)

(58) Field of Classification Search
CPC . H04L 12/5689; H04L 12/4645; H04L 12/56; H04L 2012/6443; H04L 45/00–45/04; H04L 49/3009
See application file for complete search history.

(56) References Cited

U.S. PATENT DOCUMENTS

| 6,882,627 B2 | 4/2005 | Pieda et al. | 370/248 |
| 6,904,462 B1 | 6/2005 | Sinha | 709/226 |

(Continued)

FOREIGN PATENT DOCUMENTS

JP   WO 2014/188638    11/2014    ........ G06F 11/36

OTHER PUBLICATIONS

"Shared Risk Resource Group"—Wikipedia, Feb. 28, 2017.*
(Continued)

*Primary Examiner* — Warner Wong
(74) *Attorney, Agent, or Firm* — Campbell Stephenson LLP

(57) ABSTRACT

A method, apparatus, and computer-readable storage medium are disclosed for processing shared risk group (SRG) information in communications networks. The method includes processing, at a first network layer, first network information comprising a plurality of SRG identifiers. The processing includes producing second network information comprising a smaller number of SRG identifiers than that of the plurality of SRG identifiers. The method further includes sending at least a portion of the second network information to the second network layer. The apparatus includes a network interface adapted to send network information comprising SRG information, a processor coupled to the network interface, and a memory coupled to the processor and adapted to store program instructions operable when executed to carry out steps of the method. The storage medium is configured to store program instructions that when executed are configured to cause a processor to carry out steps of the method.

14 Claims, 10 Drawing Sheets

Related U.S. Application Data continuation-in-part of application No. 14/047,981, filed on Oct. 7, 2013, now Pat. No. 9,294,392.

(60) Provisional application No. 61/710,121, filed on Oct. 5, 2012.

(51) Int. Cl.
*H04L 12/715* (2013.01)
*H04L 12/46* (2006.01)
*H04L 12/721* (2013.01)

(56) References Cited

U.S. PATENT DOCUMENTS

| | | | |
|---|---|---|---|
| 7,035,209 B2 | 4/2006 | Dang et al. | 370/228 |
| 7,099,286 B1* | 8/2006 | Swallow | H04L 45/02 |
| | | | 370/255 |
| 7,209,975 B1 | 4/2007 | Zang et al. | 709/238 |
| 7,457,237 B2 | 11/2008 | Zetterlund et al. | 370/225 |
| 7,489,866 B2* | 2/2009 | Ozugur | H04L 12/56 |
| | | | 398/57 |
| 7,551,550 B2 | 6/2009 | Sinha | 370/217 |
| 7,593,340 B2 | 9/2009 | Li et al. | 370/235 |
| 7,697,455 B2 | 4/2010 | Sadanada | 370/254 |
| 7,885,179 B1 | 2/2011 | Bryant et al. | 370/216 |
| 8,743,679 B2* | 6/2014 | Gerstel | H04L 45/02 |
| | | | 370/217 |
| 9,288,110 B2* | 3/2016 | Liu | H04L 41/0893 |
| 9,667,550 B2* | 5/2017 | Gredler | H04L 47/125 |
| 2002/0131424 A1* | 9/2002 | Suemura | H04L 41/12 |
| | | | 370/400 |
| 2002/0191545 A1 | 12/2002 | Pieda et al. | 370/238 |
| 2003/0043747 A1 | 3/2003 | Edwin et al. | 370/238 |
| 2003/0131130 A1* | 7/2003 | Malkosh | H04L 69/40 |
| | | | 709/238 |
| 2003/0147352 A1 | 8/2003 | Ishibashi et al. | 370/248 |
| 2003/0174644 A1 | 9/2003 | Yagyu | 370/228 |
| 2004/0165537 A1* | 8/2004 | Lee | H04L 12/5695 |
| | | | 370/252 |
| 2004/0205237 A1 | 10/2004 | Doshi et al. | 709/241 |
| 2004/0205239 A1 | 10/2004 | Doshi et al. | 709/241 |
| 2004/0218612 A1* | 11/2004 | Zetterlund | H04L 29/06 |
| | | | 370/401 |
| 2005/0073958 A1 | 4/2005 | Atlas et al. | 370/238 |
| 2005/0088965 A1 | 4/2005 | Atlas et al. | 370/216 |
| 2006/0004916 A1 | 1/2006 | Caviglia et al. | 709/223 |
| 2006/0114818 A1 | 6/2006 | Canali et al. | 370/216 |
| 2006/0140111 A1* | 6/2006 | Vasseur | H04L 45/02 |
| | | | 370/216 |
| 2006/0140190 A1* | 6/2006 | Lee | H04L 45/04 |
| | | | 370/395.3 |
| 2007/0058607 A1 | 3/2007 | Mack-Crane et al. | 370/351 |
| 2008/0002664 A1 | 1/2008 | Li et al. | 370/351 |
| 2009/0103442 A1 | 4/2009 | Douville | 370/248 |
| 2010/0061720 A1* | 3/2010 | Fiaschi | H04L 45/00 |
| | | | 398/2 |
| 2010/0302935 A1 | 12/2010 | Zhang et al. | 370/218 |
| 2011/0080827 A1 | 4/2011 | Zetterlund et al. | 370/225 |
| 2011/0087784 A1* | 4/2011 | Liu | H04L 41/147 |
| | | | 709/226 |
| 2011/0280580 A1 | 11/2011 | Wexler | 398/79 |
| 2012/0014690 A1* | 1/2012 | Gruber | H04B 10/071 |
| | | | 398/25 |
| 2012/0185229 A1* | 7/2012 | Perrett | G06N 3/126 |
| | | | 703/13 |
| 2012/0307644 A1* | 12/2012 | Gandhi | H04L 41/0893 |
| | | | 370/241 |

OTHER PUBLICATIONS

Marco Tacca et al., Local Detection and Recovery from Multi-Failure Patterns in MPLS-TE Networks, IEEE ICC 2006, p. 658-663.

D. Awduche et al., Overview and Principles of Internet Traffic Engineering, RFC 3272, Copyright © The Internet Society (2002), p. 1-71.

D. Papadimitriou et al., Inference of Shared Risk Link Groups, Internet Draft, Nov. 2001, p. 1-17.

Kompella & Rekhter, Routing Extensions in Support of Generalized Multi-Protocol Label Switching (GMPLS), Copyright © The Internet Society (2005), p. 1-27.

* cited by examiner

| Translation Table | |
|---|---|
| Lower-layer SRG identifier | Upper-layer SRG ID |
| LL0001 | UL01 |
| LL0008 | UL02 |
| LL0214 | UL03 |
| LL0070 | UL04 |
| ... | ... |

Fig. 4A

| Translation table with summarization | |
|---|---|
| Lower-layer SRG identifier | Upper-layer SRG ID |
| LL0001 | UL01 |
| LL0002 | UL01 |
| LL0003 | UL01 |
| LL0004 | UL01 |
| LL0005 | UL02 |
| LL0006 | UL01 |
| LL0007 | UL02 |
| LL0008 | UL02 |
| LL0009 | UL05 |
| LL0010 | UL05 |
| ... | ... |

Fig. 4B

IDENTIFYING, TRANSLATING AND FILTERING SHARED RISK GROUPS IN COMMUNICATIONS NETWORKS

RELATED APPLICATIONS

This application is a continuation of U.S. patent application Ser. No. 14/155,640 filed Jan. 15, 2014, now U.S. Pat. No. 9,385,945 issued on Jul. 5, 2016, which is a continuation-in-part of U.S. patent application Ser. No. 14/047,981 filed Oct. 7, 2013, now U.S. Pat. No. 9,294,392 issued on Mar. 22, 2016, which claims the benefit of U.S. Provisional Patent Application Ser. No. 61/710,121, entitled "Method For Using Chain Routing," filed Oct. 5, 2012. All of these applications are incorporated by reference herein in their entirety and for all purposes as if completely and fully set forth herein.

TECHNICAL FIELD

This disclosure relates to the field of communications networks, and more particularly relates to identification and use of shared risk groups in these networks.

BACKGROUND

A computer network may for some purposes be usefully described in terms of a physical layer and a logical layer. The physical layer includes the hardware for transmission of information-carrying signals over, for example, electrical cable, fiber optic line or wireless links. This physical layer corresponds to the physical layer, or Layer 1, of the seven-layer Open System Interconnection (OSI) reference model. The logical layer generally includes the protocols used for addressing in the network and routing of information from its source to its destination. The logical layer generally corresponds to the data link layer (Layer 2) and/or the network layer (Layer 3) of the OSI model. Part of the routing function of the logical layer in a computer network is re-routing to avoid disruption caused by a network failure, or to recover from such a disruption. The re-routing involves identifying a backup path for the information being routed. The feasibility of a backup path, however, may depend upon the reason for the network failure. If the failure of the original routing path is due to a broken fiber optic cable, for example, a backup path using the same cable will naturally fail as well. The logical layer routing algorithms are generally unaware of the correspondence between logical network nodes and their underlying physical equipment, and in fact both physical and logical network configurations may be continually changing.

The concept of a shared risk group (SRG) has developed to assist routing algorithms in finding backup paths less likely to be affected by the same network failure afflicting the corresponding primary path. An SRG may also be called a shared risk resource group (SRRG), and is generally a group of routes or paths all of which include a particular network resource, such that all of the paths in the group share the risk presented by a failure of the underlying resource. More specific types of SRG have been defined according to the type of network resource in question, including shared risk link group (SRLG), shared risk node group (SRNG), and shared risk equipment group (SREG). An SRLG is a group of routes having a common link, such as a span of optical fiber. Similarly, an SRNG is a group of routes traversing the same node, and the routes in an SREG share an equipment resource, such as a multiplexer in a wavelength division multiplexed network. "SRG" as used herein may refer to any of these types of shared risk groups. (In some other contexts, including the generalized multi-protocol label switching ("GMPLS") architecture, "SRLG" may be used to refer to shared risk groups in general.) Because an SRG can be associated with any network resource shared by multiple network routes, a given route may be a member of multiple SRGs. With information on the SRGs associated with potential routes, a routing algorithm can attempt to identify a backup path that is not in the same SRGs as its corresponding primary path; such a backup path would not share the same network resources as the primary path and therefore not be affected by the same network failures.

Association of SRGs with specific network resources is typically done within a particular routing domain. A routing domain as used herein refers to a collection of interconnected network nodes under a common administration for purposes of network configuration. A routing domain may also be referred to as an "autonomous system" (AS). A large network may include many routing domains at any of multiple network levels, each configured by a corresponding individual or organization. (Networks that come under common ownership or administration through, for example, a corporate acquisition process may continue to operate as separate routing domains based on the way they were originally configured.) SRG identifiers may be assigned manually by an administrator for the routing domain, or may in some cases be automatically assigned by network node equipment within the domain.

BRIEF DESCRIPTION OF THE DRAWINGS

The present disclosure may be better understood, and its numerous objects, features, and advantages made apparent to those skilled in the art by referencing the accompanying drawings.

FIG. 4A illustrates exemplary entries in an SRG identifier translation table.

FIG. 4B illustrates exemplary entries in an SRG identifier translation table with summarization.

DETAILED DESCRIPTION

Figure 1:
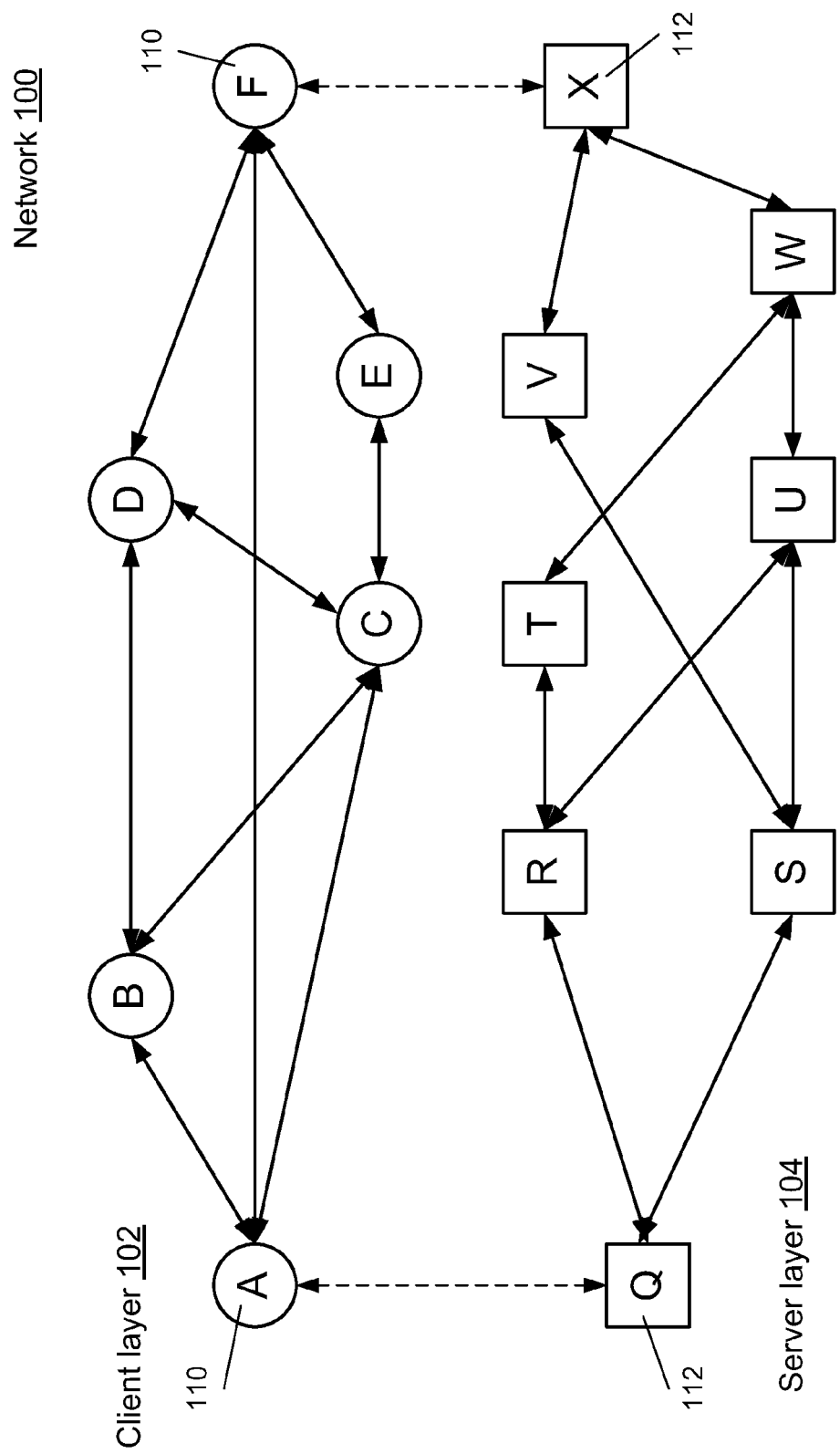
FIG. 1 is a block diagram illustrating an example of a network architecture including a client layer and a server layer.

Processing of shared risk groups in communications networks is disclosed. In one embodiment, network information comprising shared risk group (SRG) information is received from a second network layer at a first network layer. At least one SRG identifier is obtained by processing the SRG information. The SRG identifier is processed, where the processing includes one or more operations configured to ensure that the at least one SRG identifier is unique among a plurality of SRG identifiers available for processing at the first network layer. Processing of the SRG identifier may also include translating a second-layer SRG identifier into a first-layer SRG identifier. Alternatively or in addition, processing may include filtering of multiple second-layer SRG identifiers based on priority or redundancy. Processing may further include associating additional information with an SRG identifier, such as a routing domain identifier or priority information. Criteria used in processing may include criteria useful in deciding whether to retain particular SRG identifiers, such as priority threshold values or translation table relationships.

Operations configured to ensure that the SRG identifier is unique may include translation of the SRG identifier to an identifier that is unique among a set of SRG identifiers of concern to the traffic engineering function of the network. "Traffic engineering" as used herein refers to the measurement and control of network traffic, and in particular to control and optimization of information routing in the network. This is in analogy to the definition of Internet Traffic Engineering given in IETF informational memo RFC 3272, "Overview and Principles of Internet Traffic Engineering," by D. Awduche et al., May 2002, available at http://tools.ietf.org/html/rfc3272, hereby incorporated by reference as though fully set forth herein. Operations configured to ensure that the SRG identifier is unique may also include association of a routing domain identifier with the SRG identifier. In some embodiments, such operations may include operations to verify that the SRG identifier, as obtained from the SRG information, is unique among the SRG identifiers of interest, rather than operations to alter the SRG identifier in order to make it unique. Such an operation to ensure uniqueness by verification may in some embodiments include comparing the SRG identifier to a data structure including SRG identifiers of concern to the traffic engineering function of the network. In another embodiment, verification may include reading a routing domain identifier associated with the SRG identifier, and determining that SRG identifiers assigned by the identified routing domain are sufficiently unique.

In general, an SRG may be defined whenever there are multiple routes or paths in a "client" layer sharing a risk of failure associated with a resource provided by an underlying "server" layer. In some embodiments, for example, both the client and server layers could involve logical paths and resources, or both could involve physical paths and resources. Typically the client layer is a higher layer within the hierarchy of a layered model of the network, where a higher layer reflects an increased degree of abstraction with respect to the physical network elements. In addition to its application in a multilayer context, this client/server framework could be applied within a single layer. Two routing domains within a layer may operate in a client/server relationship, for example.

Although the methods disclosed herein are described in the context of a boundary between two network layers and/or two domains, it should be recognized that typical networks may include multiple layers and/or multiple domains. The present disclosure also contemplates application of the disclosed methods to multiple boundaries between layers and/or domains. It is also noted that in some networks information may be passed between layers that are not adjacent. The disclosed methods may therefore apply to information passed between layers that do not directly interact with one another.

The methods and systems disclosed herein may therefore be applicable to any practical combinations of a client and server in packet, time-division multiplexing (TDM), and optical networks, either between different layers or within a single layer. Such client and server layers may include, without limitation: Internet Protocol (IP), Multiprotocol Label Switching (MPLS), Ethernet, Optical Transport Network (OTN), Synchronous Optical Networking/Synchronous Digital Hierarchy (SONET/SDH), and dense wavelength division multiplexing (DWDM). Variants of these layer technologies which may also act as a client or server layer as described herein include the IP/MPLS and MPLS-Transport Protocol (MPLS-TP) variants of MPLS and the "QinQ" and Provider Backbone Bridge (PBB) variants of Ethernet. Packet transport layers may include Ethernet and MPLS-TP, TDM transport layers may include OTN and SONET/SDH, and DWDM may be considered an optical transport layer. Exemplary combinations of client and server in a multilayer system include Ethernet (client) over OTN (server) and MPLS-TP (client) over OTN (server).

As noted above, an SRG could potentially be associated with any link, node, or other network resource along a route that is shared with other routes. A given route or path through a network could therefore be a member of many SRGs, potentially hundreds, especially in the case of SRG assignment in a lower layer of the network, at or near the physical layer. Identification of the SRGs associated with a route may be shared between network layers, and between routing domains within a network layer. The applicable SRG identifiers may be stored in each routing domain in, for example, a link state database associated with an interior gateway protocol (IGP) for that domain. Routing and storage of such large numbers of SRG identifiers may cause a significant increase in storage requirements for the network and may also impact network performance in areas such as routing protocol computation speed and speed of "flooding" needed information throughout the network. Moreover, many of the SRGs established in one network layer may have little relevance for the routes in a different layer, especially in the case of SRGs established in the server layer of a client/server multilayer architecture.

In addition, lack of coordination between routing domains in configuration of SRGs can result in multiple SRG identifiers being associated with a single network resource, or in association of the same SRG identifier with two or more different network resources. The IETF proposed standard RFC 4202 describes an SRLG as being "identified by a 32 bit number that is unique within an [Interior Gateway Protocol] domain," allowing for the possibility of non-unique identification in the case of multi-domain networks. This proposed standard, "Routing Extensions in Support of Generalized Multi-Protocol Label Switching (GMPLS)" by K. Kompella et al., RFC 4202, October 2005, available at https://datatracker.ietf.org/doc/rfc4202/, is hereby incorporated by reference as though fully set forth herein. This non-unique identification of SRLs can thwart attempts by a routing protocol to specify backup paths diverse from their corresponding primary paths.

Another issue that can arise with the use of SRGs is that upper-layer routes that may appear to be independent really are not, because the network features associated with separate shared risk groups may have some tendency to be affected by the same adverse events. For example, upper-layer routes that depend on lower-layer paths through separate conduits passing through the same building may be diverse with respect to power feeds and cooling zones, but not with respect to destruction of the building by natural disaster or terrorist attack.

This disclosure describes methods and systems for including additional information in or associated with SRG identifiers, and for translating and/or reducing the number of SRG identifiers at certain boundaries between network layers or between routing domains. Additional information in an SRG identifier may include an AS identifier, or domain identifier, which may in some embodiments be assigned by the entity responsible for the network resource associated with the SRG (the resource at risk). In an embodiment, this AS identifier is stored in a 4-byte AS field in a larger extended-SRG identifier format. Alternatively or in addition to an AS identifier, additional information in an SRG identifier may include priority information reflecting the relative importance of the SRG and its associated network resource. In an embodiment, the priority information is stored in a 3-bit priority field in an extended-SRG identifier format. Alternatively, the priority information may be encoded into 3 bits of a 32-bit SRG identifier, with an additional bit used as an indicator of whether priority information is included. In yet another embodiment, a flag associated with a type-length-value (TLV) data structure used by GMPLS to carry a set of 32-bit SRG identifiers associated with a route may be used to indicate whether priority information is included in the SRG identifiers within the TLV.

In some embodiments additional information may be associated with an SRG identifier without encoding of the information directly into the SRG identifier or the standard SRLG TLV element. For example, an AS identifier may be associated with one or more corresponding SRG identifiers in a data structure maintained by a network controller or other processing system associated with the network. Similarly, priority information could be associated with SRG identifiers in such a data structure. In a further embodiment of an extended SRG identifier, an AS identifier or domain identifier may be concatenated with a standard 32-bit SRG identifier to form an extended SRG identifier.

A translation function may be installed in connection with certain network layer boundaries or domain boundaries to translate inconsistently-assigned SRG identifiers into consistently assigned identifiers. This may be particularly useful when done between different layers in a multilayer network. Such translation may allow diverse backup routes to be specified and facilitate routing optimization in multilayer networks. For example, a translation function could be used in connection with the boundaries between optical nodes and packet nodes in a network using generalized multi-protocol label switching (GMPLS). This could allow translation of inconsistent SRG identifiers assigned by, for example, different providers of DWDM circuits into a consistent set of SRG identifiers used by the Internet service provider (ISP) leasing the DWDM circuits. In an embodiment, a similar translation function could be used in connection with a boundary between domains within a single layer, if SRG identifiers are assigned inconsistently between the domains. These translation functions could in some embodiments be combined with filtering of priority information contained in the SRG identifiers in the manner discussed above. In such embodiments, further processing such as translation could be performed for only the highest-priority SRGs.

In addition to the translation function described above, a condensing or summarizing function for reducing the number of SRG identifiers passed across a boundary between network layers or between routing domains is disclosed herein. (Or, to the extent that all SRG identifiers can be said to be passed across a boundary, the number of identifiers retained and/or stored on the other side of the boundary may be reduced.) Like the translation function, the summarizing function may be used in connection with a boundary between layers in a multilayer network, or in some embodiments a boundary between domains within a layer. In an embodiment, the summarizing function removes from a group of SRG identifiers to be passed to a client layer all but one of a group of SRG identifiers associated with multiple network resources located along the same non-branched segment of a route within a server layer. The summarizing function may in some embodiments be combined with the translation function described above.

FIG. 1 illustrates an embodiment of a network architecture suitable for implementation of the methods and systems described in this disclosure. Network 100 can be described with a 2-layer model. Client layer 102 includes nodes labeled A through F, and server layer 104 includes nodes labeled Q through X. In one example of such a multilayer network, client layer 102 may be an IP/MPLS layer and server layer 104 may be a DWDM layer. In such an embodiment upper layer nodes A through F would represent routers and lower layer nodes Q through F would be optical nodes such as optical switches. The arrows between routers A through F would represent data connections rather than physical ones, and the arrows between optical nodes Q through X would represent optical fiber connections. Inter-layer signaling connections between nodes A and Q and between nodes F and X could be implemented in such an embodiment using a GMPLS User to Network Interface (UNI), in which the client layer UNI-C node is considered a "user" of the server network. In the embodiment of FIG. 1, routers A and F may be configured as UNI-C nodes 110 which interact with elements Q and X of the server network, configured as UNI-N nodes 112. The connections between nodes in FIG. 1 may carry all kinds of information, depending on the network configuration, including the user data or "payload" as well as network information concerning operation of the network. As used herein, "network information" includes information regarding shared risk groups in a network, or "shared risk group information". Shared risk group (SRG) information may include shared risk group identifiers and any other data or information associated with shared risk groups.

At the client layer, multiple data connection routes between nodes A through F can be used to connect one node to another. To connect nodes A and F, for example, possible routes include ABDF, ACEF, ABCEF, ABCDF, and ABDCEF. Each of these routes in the client layer is associated with a specific path in the server layer, although depending on the routing scheme used the client layer routing control plane may not have knowledge of that server layer path.

Definition of SRGs for network resources (links, nodes, equipment) or other aspects of the server network that could lead to failure can help the client layer routing control plane recover from failures. SRG information, including the set of SRG identifiers associated with a particular route, can help the control plane determine backup routes less likely to be affected by the same server-layer events that may cause a primary route failure. In practice, however, there are difficulties with SRG-aided routing, especially in the case of fully automated approaches to obtaining and using SRG information.

One difficulty is that the SRG associated with a given network resource or feature may be defined both in a client layer and in an underlying server layer. The SRG associated with a single feature could therefore be assigned a different name or identifier by each layer, or the same SRG identifier could be assigned by each layer to a completely different feature. This lack of unique definition of SRGs may cause confusion and error in backup route determination.

Another problem when SRG information is passed between layers is that the number of features for which the server layer may provide SRG information may be much greater than the client layer needs or can effectively use. Actual networks of course have many more nodes than shown in the simplified representation of FIG. 1, and data may be routed through large numbers of nodes, making route calculations very complex. Moreover, the number of network features that may potentially be associated with an SRG can be extremely large. In an embodiment for which FIG. 1 represents an IP over DWDM implementation, the optical network at the server layer can have many additional features not shown in FIG. 1, such as, for example, amplifiers, replaced fiber sections and topographical features along the fiber lengths between nodes. Although any such feature could be assigned an SRG associated with its potential failure, providing SRGs for all of the possible features to the client layer can provide an overwhelming amount of data for a routing algorithm to process. In some cases, an SRG may be assigned more as a way of providing an identifier for a feature than as a reflection of any significant risk of failure. In addition, SRGs for features located in facilities along server-layer routes may often provide redundant information, most of which is not helpful at the client layer.

Figure 2:
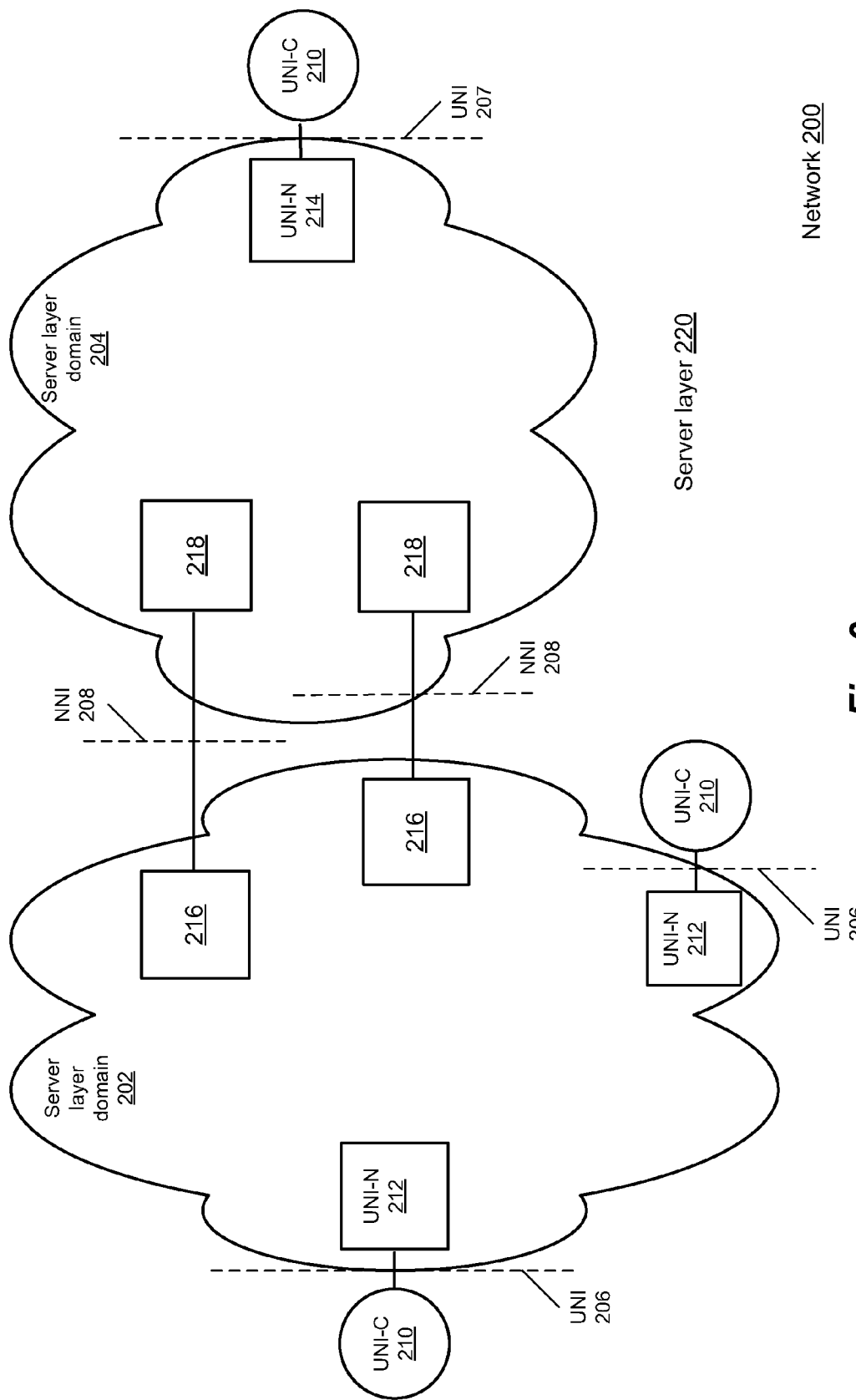
FIG. 2 is a block diagram illustrating a boundary between two domains within a server layer of a network having architecture similar to that of FIG. 1.

A different view of a portion of a network having an architecture similar to that of FIG. 1 is shown in FIG. 2. Server layer 220 of network 200 includes two server layer domains 202 and 204. In the embodiment of FIG. 2, nodes 212 in domain 202 and node 214 in domain 204 are configured as UNI-N nodes for communication with client layer UNI-C nodes 210 across UNI 206 between server layer domain 202 and the client layer and UNI 207 between server layer domain 204 and the client layer. UNI-N nodes 212 and 214 are similar to UNI-N nodes 112 of FIG. 1, and UNI-C nodes 210 are similar to UNI-C nodes 110 of FIG. 1. Nodes 216 at the boundary of domain 202 are connected to nodes 218 at the boundary of domain 204 across Network to Network Interfaces (NNIs) 208. Other nodes within domains 202 and 204, and the interconnections between nodes within the domains are not shown in FIG. 2.

NNI 208 is an example of a boundary between different domains within a single layer of a network. Routes within server layer 220 may in some embodiments cross this domain boundary and multiple other such boundaries. Because SRGs may be configured within each domain, non-unique SRG identifiers may result, causing problems for routing algorithms in a manner similar to that described with respect to FIG. 1.

Figure 3:
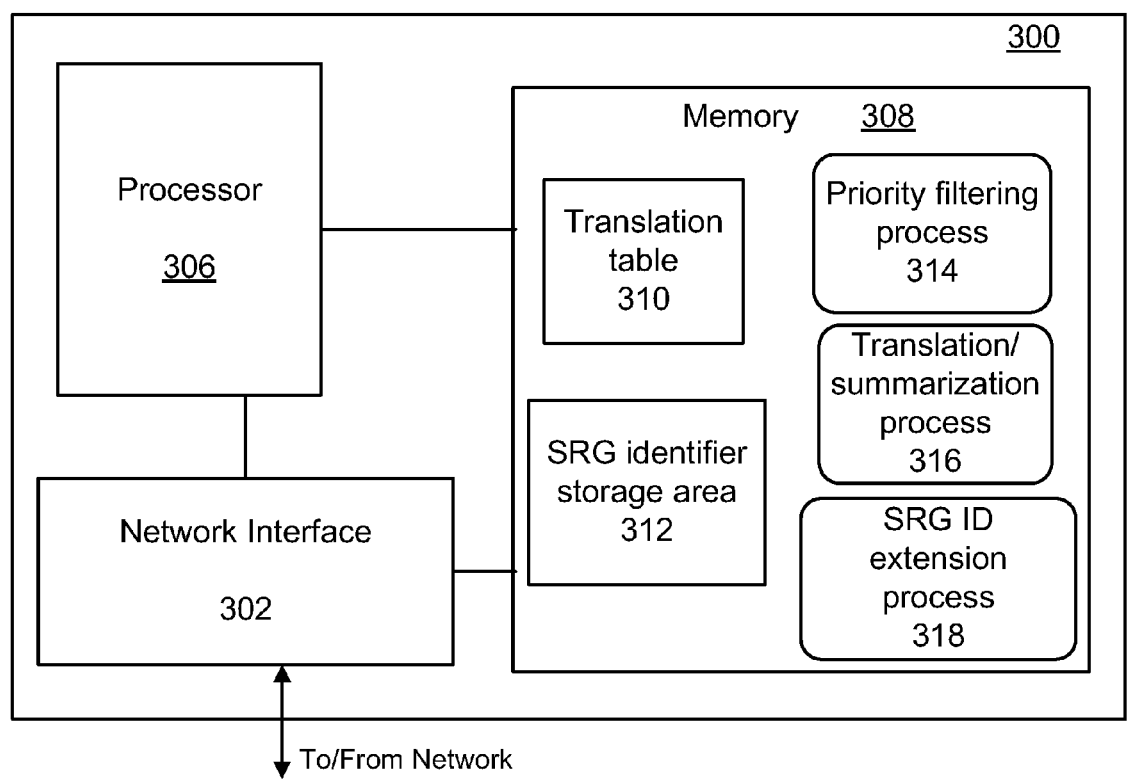
FIG. 3 is a block diagram illustrating an embodiment of an apparatus that can be used in conjunction with a network like that of FIG. 1.

A block diagram of an apparatus that may be used in conjunction with a network to implement the methods described herein is shown in FIG. 3. Apparatus 300 of FIG. 3 is configured for connection to a network, but is not necessarily a node within the network. Apparatus 300 may form a portion of a network management system for one or more layers of the network. As such, the apparatus could form a portion of a network controller or a server running a virtual networking application. Alternatively, apparatus 300 could be implemented using a more traditional network device such as a router. In embodiments for which apparatus 308 is implemented as a router, the router is preferably a router at a boundary between network layers or between domains, such as UNI-C routers 210 of FIG. 2 at the client layer to server layer interface, or routers 216 and 218 of FIG. 2 at a routing domain interface within the server layer.

Apparatus 300 includes network interface 302 for connection to one or more networks. Network interface 302 contains the mechanical, electrical and signaling circuitry for communicating data over physical links coupled to a network such as network 100 of FIG. 1. Network interface 302 may be configured to transmit and/or receive data using a variety of protocols and protocol suites, including MPLS, GMPLS, TCP/IP, SONET/SDH, Ethernet, OTN, and so forth. Network interface 302 may also be used to implement one or more virtual network interfaces, such as for Virtual Private Network (VPN) access. Network interface 302 is coupled to processor 306 and may also be coupled to memory 308 of apparatus 300.

Memory 308 includes a plurality of storage locations addressable by processor 306 and network interface 302 for storing software programs and data structures associated with the methods described herein. Memory 308 includes SRG identifier storage area 312 for storing SRG identifiers that may be used by routing algorithms and other control plane functions. SRG identifier storage area 312 may include any data structures or other storage locations suitable for storing SRG identifiers in a form useful for network processes. In an embodiment, SRG identifier storage area 312 may be within a link state database for a routing domain of a network.

SRG identifier storage area 312 may be configured to store SRG identifiers in various suitable formats. In one embodiment, storage area 312 is adapted to store each SRG identifier as an unstructured 32-bit value. In another embodiment, SRG identifier storage area 312 is adapted to store an SRG identifier as an extended SRG identifier including a standard 32-bit SRG identifier concatenated with an identifier associated with the routing domain of the network resource associated with the SRG identifier. In an embodiment, the identifier associated with the routing domain is an AS identifier. An AS identifier or AS number may in some cases be assigned to a routing domain by a telecommunications provider and be publicly available. In other cases, particularly for private networks, AS numbers or other routing domain identifiers may not be publicly known. In an embodiment, a routing domain identifier may be assigned through operation of apparatus 300 when the domain identifier is not publicly known. The domain identifier may be assigned in a way that makes it unique over an area of concern for the network in question. In some embodiments, the domain identifier may be assigned to be globally unique. In an embodiment of the extended SRG identifier including a domain identifier, the domain identifier is represented as a 4-byte value.

Making domain identifiers unique over the area of concern for a network should make the domain identifiers sufficiently unique that extended SRG identifiers formed using the domain identifiers are each associated with no more than one respective network resource along any primary or backup paths of interest. In addition, the domain identifiers should be sufficiently unique that each network resource along a path of interest is associated with no more than one of the extended SRG identifiers. Such extended SRG identifiers should therefore be unique over the set of SRG identifiers of concern for the traffic engineering function of the network in question. In some embodiments, the extended SRG identifiers are unique over a set of SRG identifiers available for processing at a network layer. For example, SRG identifiers at an upper network layer may be obtained from network information passed to the upper layer from a lower layer. Alternatively or in addition, SRG identifiers may also be originally assigned at the upper layer. SRG identifiers arriving at the upper layer in either or both of these ways may be available for processing at the upper network layer. Such processing could include translation, summarization, association of additional information, and/or other operations and processes described herein. In a further embodiment, the extended SRG identifiers are unique over the set of all SRG identifiers available for processing at a network layer.

In alternative embodiments of a network having an upper network layer and a lower network layer, processing of SRG identifiers may be performed at least in part at the lower network layer, such that processed SRG identifiers from the lower layer may then be passed to the upper layer. For example, the number of SRG identifiers to be passed to the upper layer could be reduced by first performing at the lower layer a filtering or summarization process as described in this disclosure. In such an embodiment, the SRG identifiers passed to the upper network layer would be available for additional processing at the upper layer. The additional processing at the upper layer could include translation, association of additional information, additional filtering or summarization, and/or other operations and processes described in this disclosure. As another example, processing at the lower network layer may include one or more operations configured to ensure that the SRG identifiers at the lower network layer are unique over a set of SRG identifiers available for processing at the lower network layer. In a further embodiment, the processed SRG identifiers may be unique over all of the SRG identifiers available for processing at the lower layer. In some embodiments in which processing is performed at the lower network layer, network information relating to the upper network layer may be received at the lower network layer for use in the processing.

Alternatively or in addition to the routing domain identifiers discussed above, in some embodiments an extended SRG identifier may also include priority information or a priority index. The priority information may in some embodiments be encoded into a designated portion of the standard 32-bit SRG identifier, preferably a 3-bit portion. In such an embodiment, an additional portion of the standard SRG identifier may be designated for storing a pattern to signal whether priority information is included in the SRG identifier. Alternatively, a flag in a type-length-value structure for SRG identifiers could be set to indicate whether priority information was included in the SRG identifiers.

In some embodiments, the extended SRG identifier may take the form of a type-length-value (TLV) structure having a sub-TLV domain identifier field. Such an embodiment may also include a priority information sub-TLV. In an embodiment, the priority sub-TLV may be a 3-bit field, and the domain identifier sub-TLV may be a 4-byte field.

In addition to SRG identifier storage area 312, memory 308 of apparatus 300 may in some embodiments include translation table 310. Translation table 310 relates an SRG identifier assigned to a particular network feature by a different network layer or an external routing domain to the corresponding SRG identifier assigned by the local network layer or local domain to the same network feature. Translation table 310 is used during execution of translation process 316. FIG. 4A illustrates example entries in translation table 310 for translation of SRG identifiers assigned at a lower network layer to those assigned at an upper network layer. In the embodiment of FIG. 4A the lower-layer SRG identifiers are generally larger numbers than the corresponding upper-layer SRG IDs. In an embodiment, only a subset of the available lower-layer SRG identifiers is entered into the translation table. The subset of lower-layer SRG identifiers to be translated may be selected by a priority filtering process such as process 314 of FIG. 3.

In some embodiments, translation table 310 may also be used to implement a condensing or summarization function. In such an embodiment, multiple lower-layer SRG identifiers may be mapped to the same upper-layer SRG identifier. Example entries for a translation table including summarization are shown in FIG. 4B. In an embodiment, the SRG identifiers included in translation table 310 are extended SRG identifiers as described above. Translation of SRG identifiers between network layers may involve network layers within a single routing domain, or alternatively may involve a boundary between separate routing domains within respective network layers. A similar translation of SRG identifiers may also be performed between routing domains, whether the domains are in separate network layers or within the same layer (for example, at NNIs). Such an embodiment could use translation tables similar to those of FIG. 4 to relate external-domain SRG identifiers to local-domain identifiers. It is noted that a translation table such as those of FIGS. 4A and 4B may not necessarily provide a new upper-layer SRG identifier for every lower-layer SRG identifier. In some cases the SRG identifier assigned in each layer to a particular network feature may be the same. In some embodiments, a translation table may be used only for implementing a summarization function without changing the assigned SRG identifiers at all.

A translation or summarization process using a translation table such as table 310 should result in a set of upper-layer SRG identifiers that are unique over the set of SRG identifiers of concern for the traffic engineering function of the network. In some embodiments, the upper-layer SRG identifiers are unique over a set of SRG identifiers available for processing at a network layer, in a similar manner as described in more detail above with regard to extended SRG identifiers. Similarly, SRG identifiers made unique or verified to be unique through any of the operations of processes described herein may in some embodiments be unique over a set of SRG identifiers available for processing at a network layer. In a further embodiment, such SRG identifiers may be unique over the set of all SRG identifiers available for processing at the network layer.

Figure 5A:
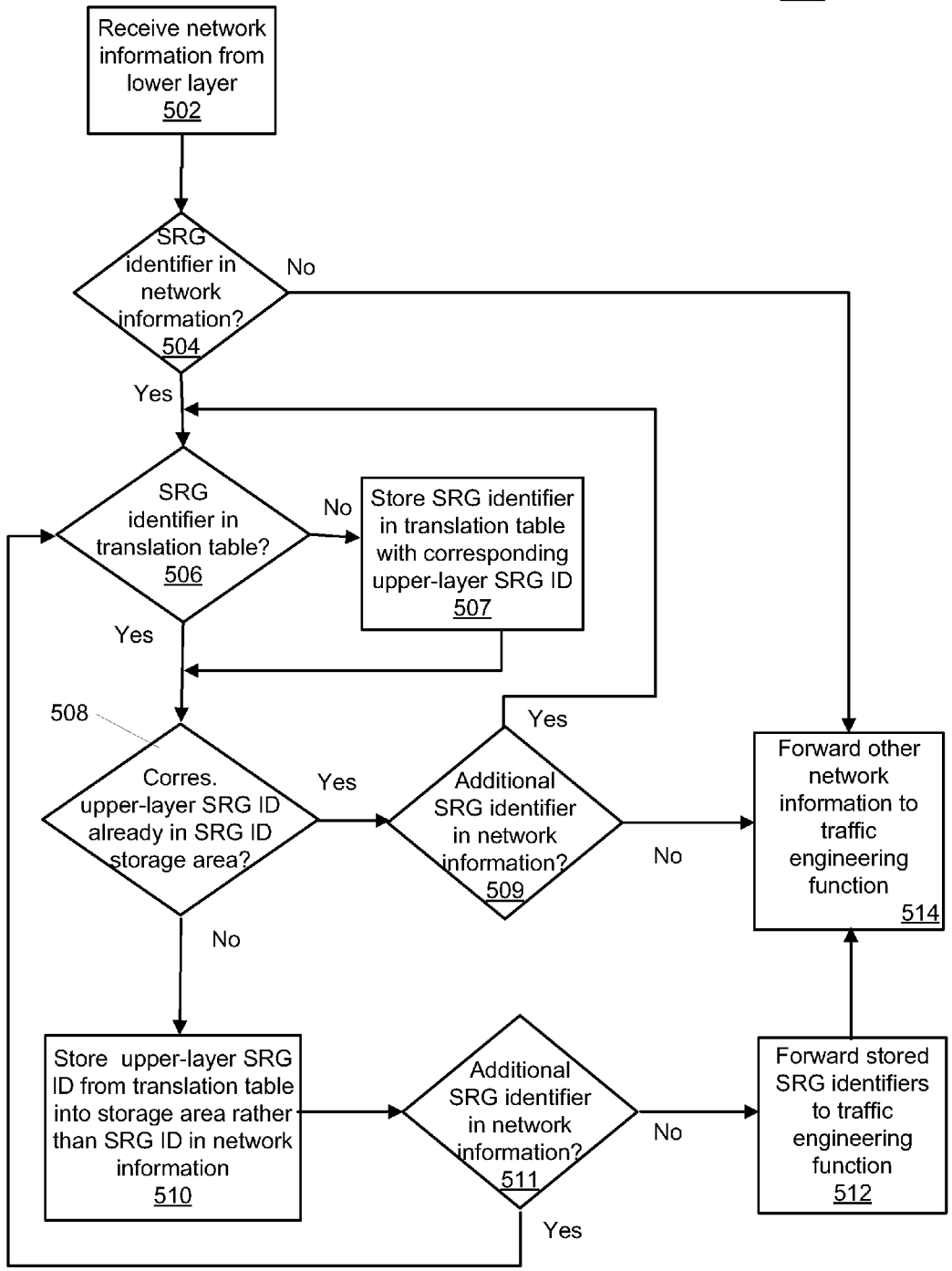
FIG. 5A is a flow chart illustrating an embodiment of a process for translation of SRG identifiers.
Figure 5B:
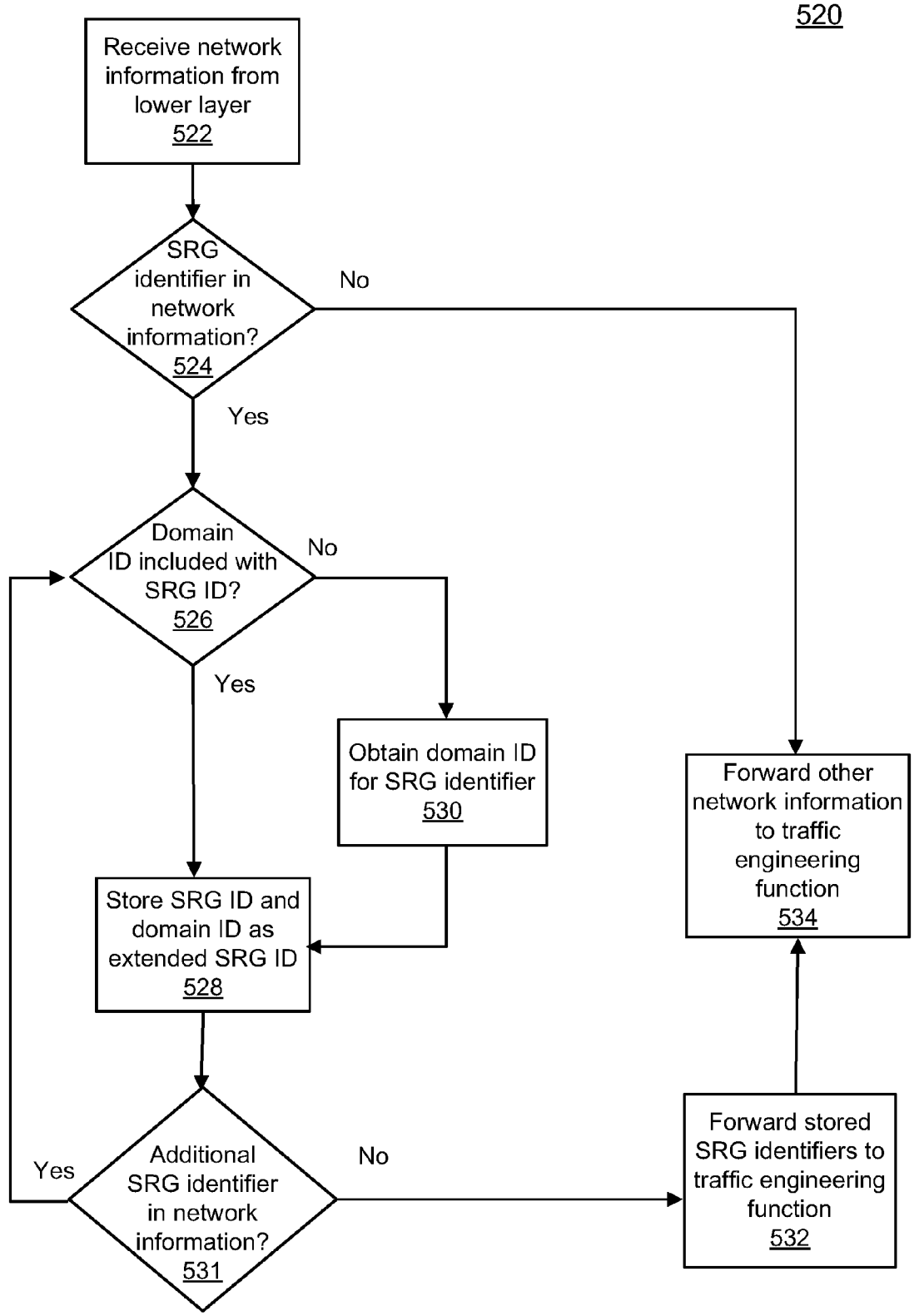
FIG. 5B is a flow chart illustrating an embodiment of a process for formation of an extended SRG identifier.
Figure 5C:
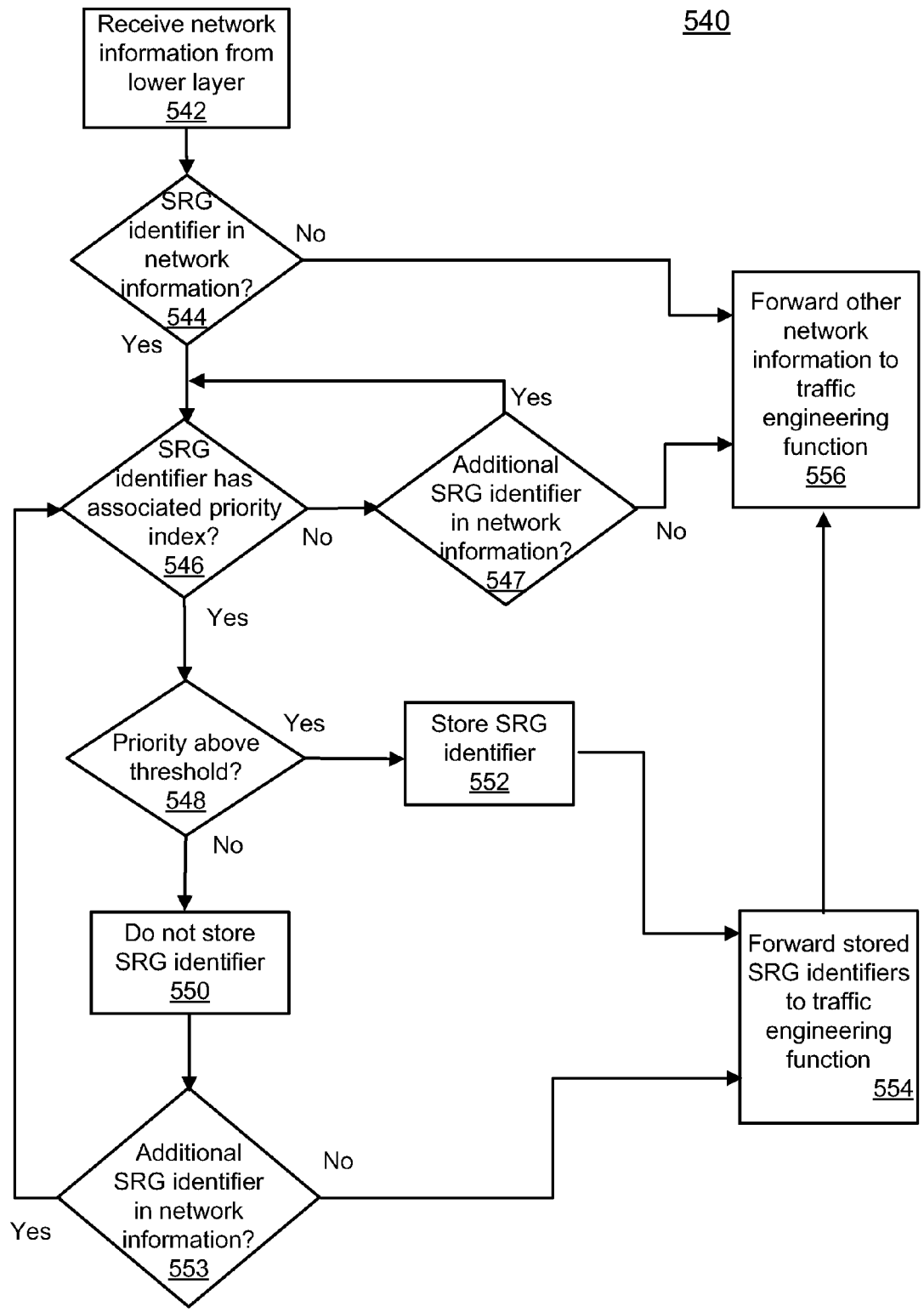
FIG. 5C is a flow chart illustrating an embodiment of a process for priority filtering of SRG identifiers.

In various embodiments, memory 308 of apparatus 300 further includes one or more of priority filtering process 314, translation/summarization process 316, and SRG ID extension process 318. Priority filtering process 314 contains computer executable instructions that when executed by processor 306 are operable to filter SRG identifiers associated with incoming data using priority information so that only SRG identifiers corresponding to network resources meeting a priority condition are stored. In this way, the number of SRG identifiers that must be processed by network routing protocols can be reduced. In an embodiment, processes 314, 316, and 318 form part of a network management system. A flow diagram illustrating an embodiment of the method performed through execution of priority filtering process 314 is shown in FIG. 5C. In the embodiment of FIG. 5C, SRG identifiers from a lower network layer are filtered at an upper network layer. Method 540 begins with receiving network information corresponding to data from a lower network layer (step 542). In an embodiment for which method 540 is implemented on a router, the router may be at a boundary between network layers. In an embodiment for which process 540 is implemented on, for example, a network controller or server, network information associated with data coming into a network node from a different network layer may be transmitted to apparatus 300 over the network.

The network information forms a portion of the control information associated with the incoming data, and is transmitted and received using methods specific to the particular technologies and protocols of the network layers involved, as understood by one of ordinary skill in the art in light of the present disclosure. For example, in the case of SONET technology, data is sent in synchronized frames, and certain portions of each data frame contain control information, or "overhead". The network information includes information helpful for network traffic engineering ("TE"), including SRG information. In addition to SRG identifiers associated with incoming data, network information may include information helpful in evaluation of SRG information to identify the most relevant SRGs associated with the data. For example, network information may include an identification of SRGs that are in series with one another along a given link in the server layer of a client/server layer pair. Network information could also include an indicator of relatedness between SRGs, especially those that are not in series. Factors in assessing relatedness may include physical proximity. Cables running in parallel through the same conduit are clearly in close physical proximity, for example. Furthermore, two parallel conduits running, for example, along opposite sides of the same railroad track are likely to both be disrupted by a major train derailment. Or two separate links traversing different parts of the same city could both be disrupted by the same natural disaster, such as hurricane, flood, or wildfire Likelihood of such events for particular SRGs may also be included in the network information. Such proximity information within the network information may be used by a traffic engineering algorithm or traffic engineering personnel to evaluate potential data paths in terms of, for example, how closely and at what points they join with or come close to other paths.

Returning to FIG. 5C, if the received network information includes an SRG identifier (decision step 544), the processor checks whether the SRG identifier is associated with a priority index (step 546). In an embodiment in which a priority index is stored in designated bits within the standard 32-bit SRG identifier structure, checking whether the SRG identifier has a priority index may be done by checking a designated bit (or range of bits) for a pattern indicating that priority information is present. In an alternative embodiment, checking for priority information within a 32-bit SRG identifier may involve checking whether a flag is set in a TLV structure carrying one or more SRG identifiers. In still another embodiment, checking for priority information may involve checking a designated priority sub-TLV in an extended SRG identifier having a TLV structure. In some embodiments, priority information may be linked to an SRG identifier through a data structure rather than a direct inclusion in the SRG identifier. In such an embodiment, checking whether an SRG identifier has a priority index would involve checking the relevant data structure. In some embodiments, a translation table such as table 310 could serve as the data structure, by including priority information such as a priority index for each of the SRGs included in the table.

If the SRG is associated with a priority index, the processor checks whether the priority indicated by the index is above a designated threshold (step 548). The priority index and designated threshold may be established by an administrator based on any desired criterion, including, for example, probability of failure of a particular network feature, importance of routes including the feature, type of feature, etc. If the priority is determined to be above the designated threshold, the SRG identifier is stored in SRG identifier storage area 312 (step 552). If the priority is below threshold, the SRG identifier is not stored (step 550). In an embodiment, the SRG identifier used in process 540 is an extended SRG identifier including a domain identifier as discussed above. The process of checking for priority information is repeated for any additional SRG identifiers found in the network information (decision step 553). When all of the SRG identifiers within the network information have been processed, the stored SRG identifiers are forwarded to the traffic engineering function of the network layer (step 554). The traffic engineering function may be automated, or may be carried out manually at least in part. The SRG identifiers having priority below the designated threshold are preferably not forwarded to the traffic engineering function. In this way, the amount of SRG data received in traffic engineering is reduced to a more manageable amount of data that may also be more relevant data.

Network information other than SRG identifiers, such as the SRG relatedness information described above, may also be forwarded to the traffic engineering function (step 556). This other network information forwarded to the TE function may also include, for example, probability of failure, mean time to failure, priority criteria as described above, and any other information useful to the TE function in making routing and backup path decisions. In the embodiment of FIG. 5C, only this other network information is forwarded to the traffic engineering function when there are no SRG identifiers in the received network information ("no" branch of decision step 544) or when there is no priority index associated with any of the SRG identifiers in the network information ("no" branches of decision steps 546 and 547). Such an embodiment limits the SRG identifiers used by the traffic engineering function of the upper layer to those designated to have priority above a defined threshold. In other words, SRG identifiers having no priority information are treated in this embodiment as if they have a below-threshold priority. In an alternate embodiment, SRG identifiers having no priority information could be stored and forwarded to the traffic engineering function, effectively treating them as having an above-threshold priority.

Translation/summarization process 316 of FIG. 3 contains computer executable instructions that when executed by processor 306 are operable to use translation table 310 to translate, for example, lower-layer SRG identifiers to upper-layer SRG identifiers. A flow diagram illustrating an embodiment of the method performed through execution of translation/summarization process 316 is shown in FIG. 5A. Like method 540 of FIG. 5C, method 500 of FIG. 5A begins with receiving network information from a lower layer and determining whether the network information includes an SRG identifier (steps 502, 504). If an SRG identifier is found, the processor determines whether the SRG identifier is in a translation table such as table 310 of FIG. 3 (decision step 506). If the SRG identifier of the received data is in the translation table, the processor determines whether the corresponding upper-layer SRG identifier found in the translation table is already in the SRG ID storage area (decision step 508). Such duplication of upper-layer SRG identifiers occurs when translation table 310 also implements a summarization function by mapping multiple lower-layer SRG identifiers to a single upper-layer SRG identifier. The upper-layer SRG ID from the translation table is stored in the SRG identifier storage area only if it has not been stored there already (step 510), thereby eliminating duplicates caused by summarization. In an embodiment of method 500, the SRG identifier used is an extended SRG identifier including a domain identifier.

If the SRG identifier found in the network information is not found in the translation table, it may be the case that the SRG identifier is associated with a network feature in the underlying layer that has recently been added to the network. In the embodiment of FIG. 5A, the SRG identifier is then added to the translation table, along with its corresponding upper-layer SRG ID (step 507). The corresponding upper-layer SRG ID is then stored in the SRG ID storage area if not already there (steps 508, 510). Determination of the corresponding upper-layer identifier may in some embodiments involve a query to the lower layer as to the specific network feature associated with the received lower-layer SRG identifier. In an embodiment, such a query may be carried out by a network management system. For a known network feature, the corresponding upper-layer SRG identifier may in some embodiments be found in a data structure maintained by a network management system of the upper network layer. In some embodiments, an upper-layer SRG identifier for a newly identified network feature may be assigned by a network management system in conjunction with the translation table storage of step 507.

The translation process described above is repeated for any additional SRG identifiers found in the received network information (decision step 511). When all of the SRG identifiers within the network information have been processed, the stored SRG identifiers are forwarded to the traffic engineering function of the network layer (step 512), as described further above in relation to step 554 of FIG. 5C. As noted above with regard to FIG. 4, a similar translation of SRG identifiers may also be performed between routing domains, whether the domains are in separate network layers or within the same layer. Such an embodiment could use translation tables that relate external-domain SRG identifiers to local-domain identifiers.

Network information other than SRG identifiers may also be forwarded to the TE function (step 514), as described above for priority filtering process 540. In the embodiment of FIG. 5A, only this other network information (i.e., no SRG identifiers) is forwarded to the traffic engineering function when there are no SRG identifiers in the received network information ("no" branch of decision step 504) or when the upper-layer SRG identifier found in the translation table is already stored for all SRG identifiers in the network information ("yes" branch of decision step 508 and "no" branch of decision step 509).

Memory 308 of FIG. 3 may also contain SRG ID extension process 318. Process 318 contains computer executable instructions that when executed by processor 306 are operable to form an extended SRG including a domain identifier. A flow diagram illustrating an embodiment of the method performed through execution of SRG ID extension process 318 is shown in FIG. 5B. Like methods 500 and 540, method 520 of FIG. 5B begins with receiving network information from a lower layer and determining whether the network information includes an SRG identifier (steps 522, 524). If an SRG identifier is found, the processor determines whether a domain identifier such as an AS identifier is included with the SRG identifier (decision box 526). Storing the SRG identifier and domain identifier together may be done in various ways. For example, the SRG identifier and domain identifier could simple be concatenated into a longer identifier. In another embodiment, a structured SRG identifier could be formed in which certain bits are allocated for the domain identifier. The extended SRG identifier could also take the form of an association of the original SRG identifier with the corresponding domain identifier. If a domain identifier is included, the processor stores the SRG identifier and domain identifier together in the SRG identifier storage space as an extended SRG identifier (box 528). If a domain identifier is not found, the processor obtains a domain identifier for the SRG identifier (box 530). If the domain identifier is publicly available, it may be obtained either automatically or manually by methods apparent to one of ordinary skill in the art in light of the present disclosure. If the domain identifier is not publicly available, the processor may instead assign a domain identifier to the SRG identifier for use by the local domain. However it is obtained, the domain identifier is then stored with the SRG identifier as an extended SRG identifier.

The SRG ID extension process described above is repeated for any additional SRG identifiers found in the received network information (decision step 531). When all of the SRG identifiers within the network information have been processed, the stored SRG identifiers are forwarded to the traffic engineering function of the network layer (step 532), as described further above in relation to step 554 of FIG. 5C. Network information other than SRG identifiers may also be forwarded to the TE function (step 534), as described above for priority filtering process 540. In the embodiment of FIG. 5B, only this other network information (i.e., no SRG identifiers) is forwarded to the traffic engineering function when there are no SRG identifiers in the received network information ("no" branch of decision step 524).

The methods of FIGS. 5A, 5B and 5C may be combined in certain embodiments. For example, SRG extension method 520 of FIG. 5B may be performed prior to method 500 or 540, so that those methods are performed using an extended SRG. In such an embodiment, storage step 528 of method 520 would be replaced by either decision step 506, as a transition into translation/summarization method 500, or decision step 546 as a transition into priority filtering method 540. In other embodiments, priority filtering method 540 may be performed prior to method 500 or 520, to reduce the number of SRG identifiers those methods are required to process. In such an embodiment, storage step 552 of FIG. 5C may be replaced by either decision step 506, as a transition into translation/summarization method 500, or decision step 526, as a transition into SRG identifier extension method 520.

The methods of FIGS. 5A, 5B and 5C are described as being performed at an upper network layer on information received from a lower layer. In alternative embodiments, similar methods might be performed at the lower layer instead, on network information that would otherwise be passed to the upper layer. In such an embodiment, steps for storing of SRG identifiers could be replaced by steps of passing the SRG identifiers to the upper layer, along with other relevant network information.

Processor 306 of apparatus 300 is configured to execute software programs and access data structures including those stored in memory 308. Processor 306 and memory 308 may take the various forms known in the art for computer systems in general, as described further below.

Example Network Device

Figure 6:
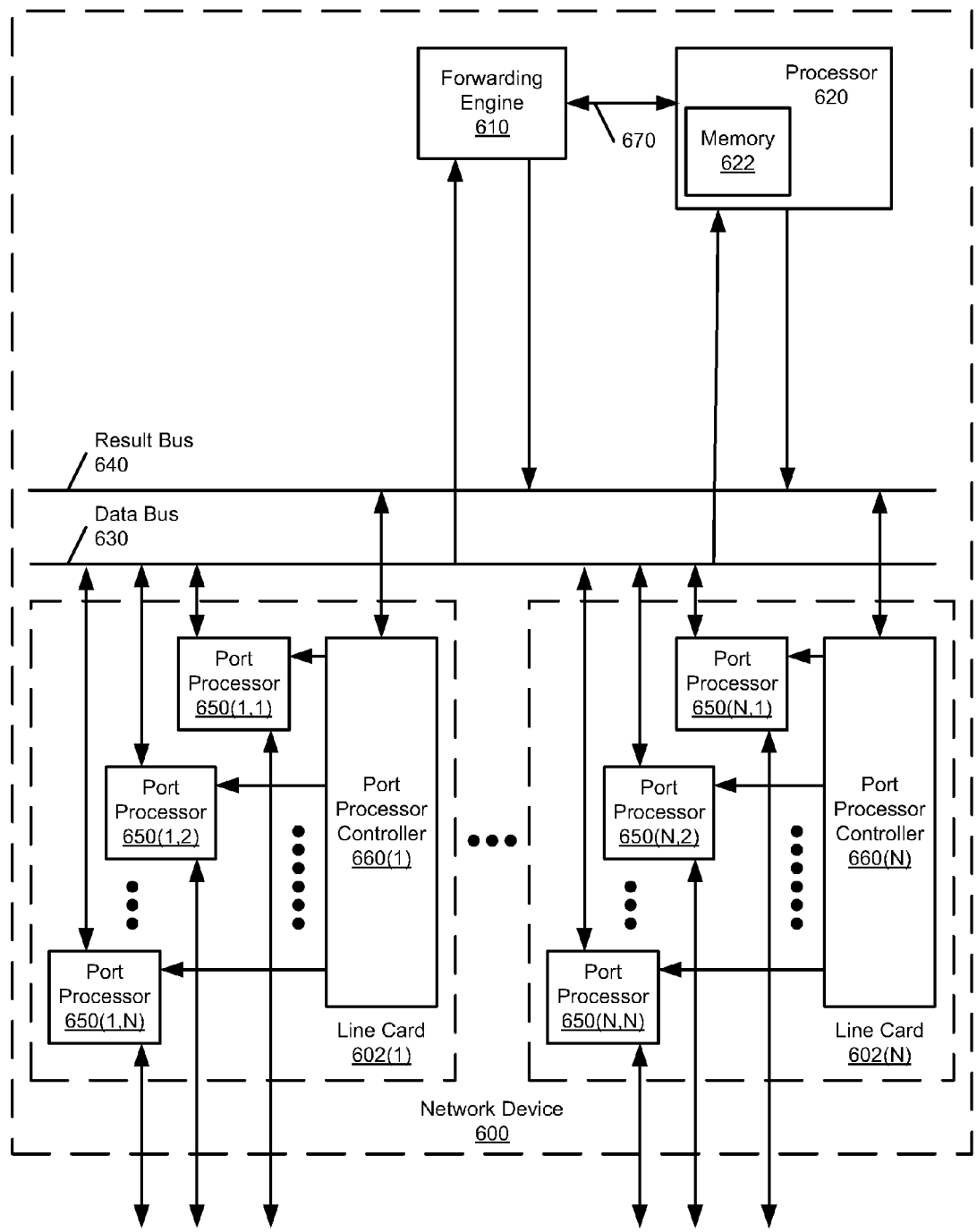
FIG. 6 is a block diagram illustrating an example of a network device that can be used to implement embodiments of the methods and devices disclosed herein.

FIG. 6 is a block diagram illustrating an example of a network device for a packet or frame network. Such a network device may in some embodiments serve as apparatus 300 of FIG. 3. In such an embodiment, memory 622 of processor 620 may include the elements stored in memory 308 of FIG. 3. In this depiction, network device 600 includes a number of line cards (line cards 602(1)-(N)) that are communicatively coupled to a forwarding engine 610 and a processor 620 via a data bus 630 and a result bus 640. Line cards 602(1)-(N) include a number of port processors 650(1,1)-(N,N) which are controlled by port processor controllers 660(1)-(N). It will also be noted that forwarding engine 610 and processor 620 are not only coupled to one another via data bus 630 and result bus 640, but are also communicatively coupled to one another by a communications link 670.

When a packet is received, the packet is identified and analyzed by a network device such as network device 600 in the following manner, according to embodiments of the present invention. Upon receipt, a packet (or some or all of its control information) is sent from the one of port processors 650(1,1)-(N,N) at which the packet was received to one or more of those devices coupled to data bus 630 (e.g., others of port processors 650(1,1)-(N,N), forwarding engine 610 and/or processor 620). Handling of the packet can be determined, for example, by forwarding engine 610. For example, forwarding engine 610 may determine that the packet should be forwarded to one or more of port processors 650(1,1)-(N,N). This can be accomplished by indicating to corresponding one(s) of port processor controllers 660(1)-(N) that the copy of the packet held in the given one(s) of port processors 650(1,1)-(N,N) should be forwarded to the appropriate one of port processors 650(1,1)-(N,N).

In the foregoing process, network security information can be included in a packet or frame sourced by network device 600 in a number of ways. For example, forwarding engine 610 can be used to detect the need for the inclusion of network security information in the packet, and processor 620 can be called into service to provide the requisite network security information. This network security information can be included in the packet during the transfer of the packet's contents from one of port processors 650(1,1)-(N,N) to another of port processors 650(1,1)-(N,N), by processor 620 providing the requisite information directly, or via forwarding engine 610, for example. The assembled packet at the receiving one of port processors 650(1,1)-(N,N) can thus be made to contain the requisite network security information.

In addition, or alternatively, once a packet has been identified for processing according to the methods described herein, forwarding engine 610, processor 620 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

It will be appreciated that, in light of the present disclosure, the variable identifier "N" is used in several instances in various of the figures herein to more simply designate the final element of a series of related or similar elements. The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Example Computer System

Figure 7:
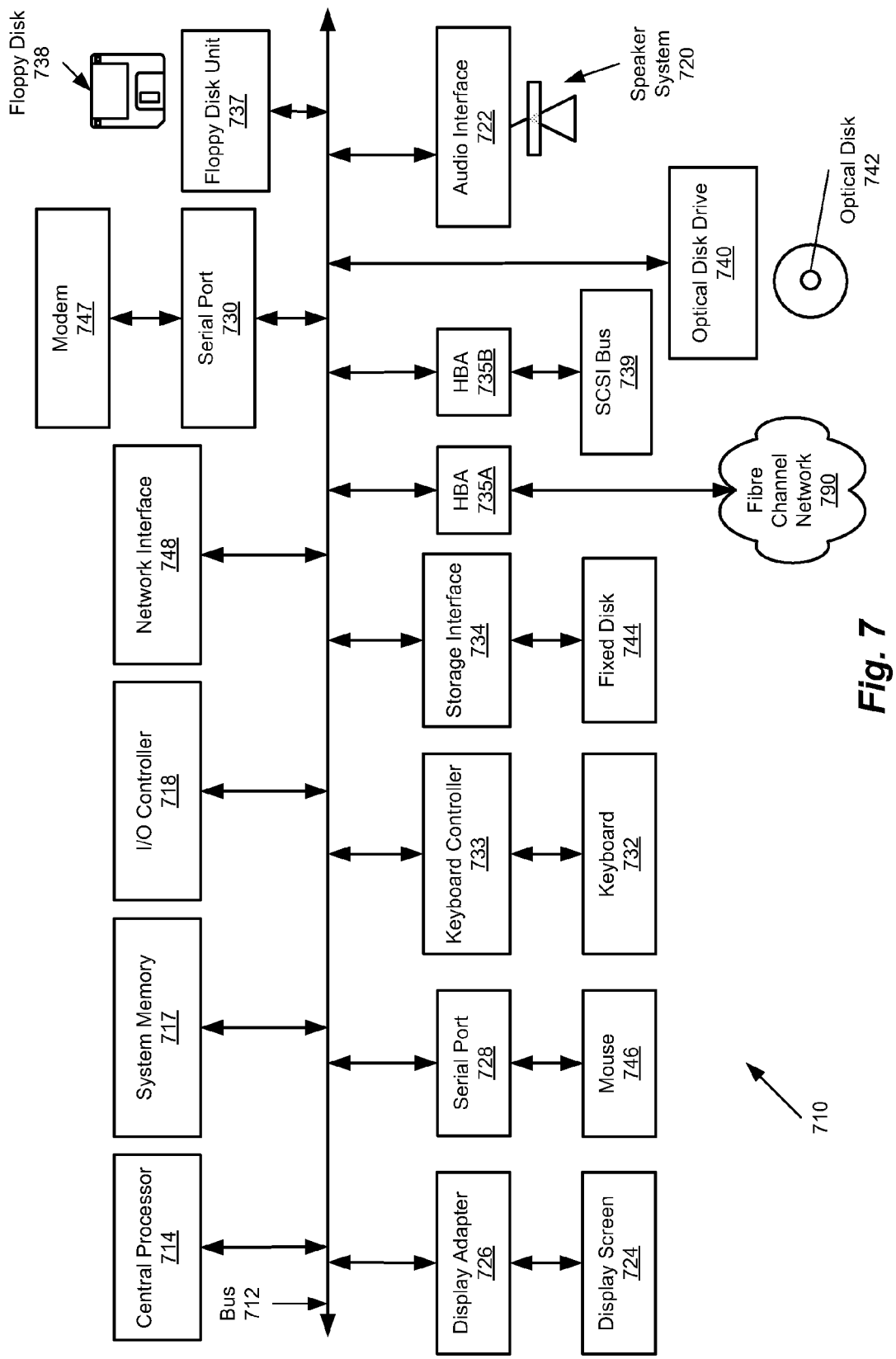
FIG. 7 is a block diagram depicting a computer system that can be used for implementing embodiments of the methods and devices disclosed herein.

FIG. 7 depicts a block diagram of a computer system 710 suitable for implementing aspects of the methods and systems described herein. For example, a server or network controller implementation of apparatus 300 in FIG. 3 could include a computer system such as system 710. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734 interfaced with a fixed disk 744, such as a hard disk drive or solid state drive, a floppy disk drive 737 operative to receive a floppy disk 738, one or more host bus adapter (HBA) interface cards such as card 735A operative to connect with a Fibre Channel network 790 and card 735B operative to connect to a SCSI bus 739, and an optical disk drive 740 operative to receive an optical disk 742. Other peripheral/network buses may be connected using host bus adapters, including SATA/ATA, SAS and USB. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 710 are generally stored on and accessed from a computer-readable storage medium, such as a hard disk drive (e.g., fixed disk 744), an optical drive (e.g., optical drive 740), a floppy disk unit 737, a USB flash drive, or other computer-readable storage medium.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Additional devices or subsystems (not shown) may be connected in a similar manner (e.g., bar code readers, document scanners, digital cameras, flash memory drives and so on). Conversely, all of the devices shown in FIG. 7 need not be present to practice the systems described herein. The devices and subsystems can be interconnected in different ways from that shown in FIG. 7. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

The operation of a computer system such as that shown in FIG. 7 is readily known in the art and is not discussed in detail in this application. Code to implement the modules of the systems described herein can be stored in computer-readable storage media such as one or more of system memory 717, fixed disk 744, optical disk 742, or floppy disk 738. The operating system provided on computer system 710 may be MS-WINDOWS®, UNIX®, Linux®, or other operating system. Computer system 710 may also support a number of Internet access tools, including, for example, an HTTP-compliant web browser having a JavaScript interpreter, such as Mozilla Firefox®, Microsoft Internet Explorer® and the like.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer-readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Example Network Environment

Figure 8:
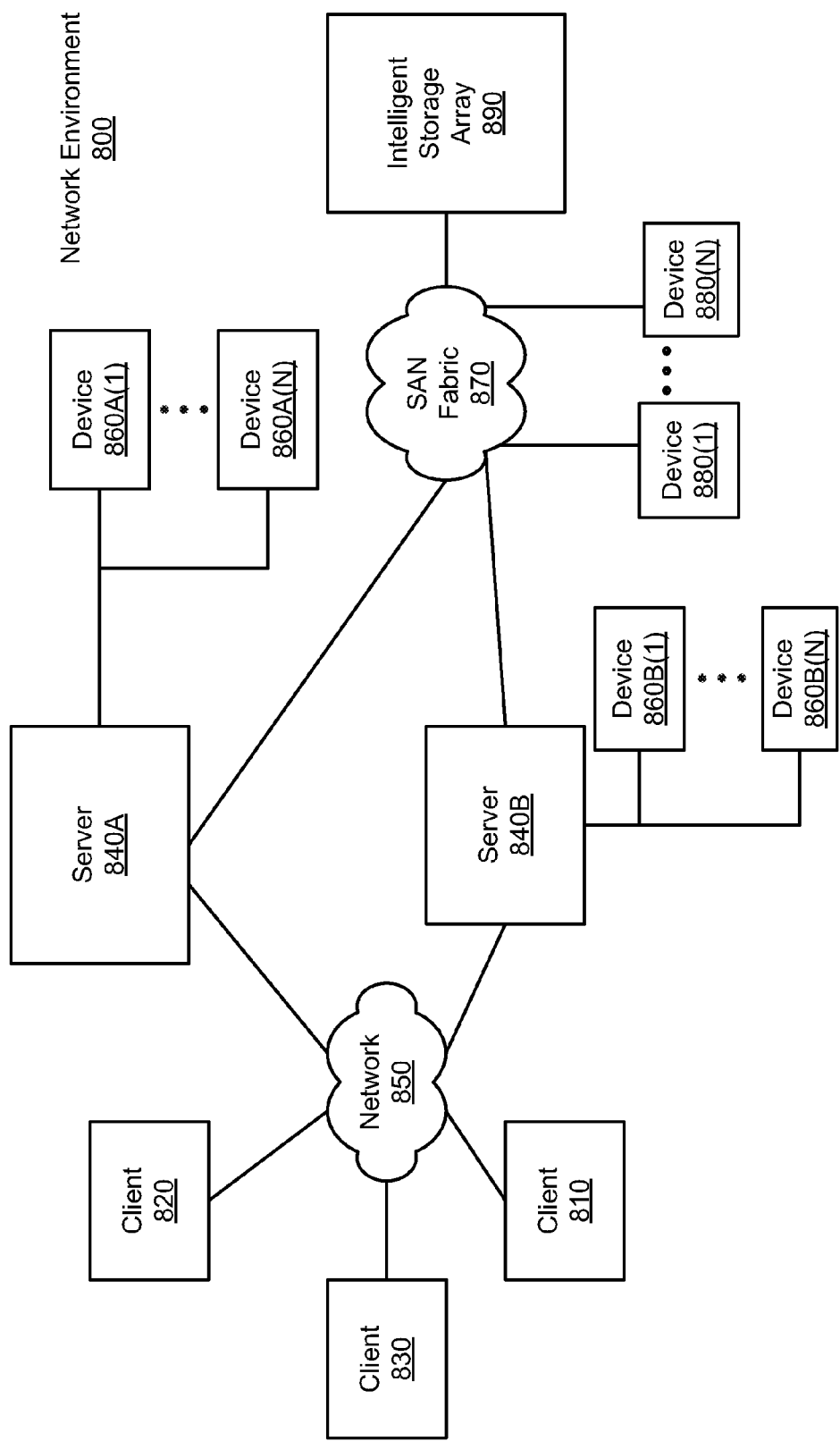
FIG. 8 is a block diagram illustrating an example of a network environment according to embodiments of the methods and devices disclosed herein.

FIG. 8 is a block diagram depicting a network environment suitable for implementation of the methods and devices described herein. Network environment 800 includes client systems 810, 820 and 830, as well as storage servers 840A and 840B, all coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710 of FIG. 7, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, it will be apparent to those skilled in the art in light of the present disclosure that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize in light of the present disclosure that the operations described in example embodiments are for illustration only. Operations may be combined or the functionality of the operations may be distributed in additional operations in accordance with the methods and systems disclosed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of a flow diagram such as those in FIG. 5 may be executed by a module (e.g., a software module) or a portion of a module or a computer system user using, for example, a computer system such as the computer system of FIG. 7. Thus, a method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   processing, at a first network layer, first network information comprising a plurality of shared risk group (SRG) identifiers assigned at the first network layer, wherein
      the processing comprises producing second network information comprising a smaller number of SRG identifiers than that of the plurality of SRG identifiers,
      the producing second network information comprises at least one of filtering the plurality of SRG identifiers or summarizing the plurality of SRG identifiers, and
      the filtering or summarizing the plurality of SRG identifiers comprises omitting from the smaller number of SRG identifiers one or more SRG identifiers corresponding to network features located along the same non-branched segment of a route within the first network layer; and
   sending at least a portion of the second network information from the first network layer to a second network layer.

2. The method of claim 1, wherein the second network information is adapted for processing at the second network layer to obtain one or more of the smaller number of SRG identifiers.

3. The method of claim 1, wherein filtering the plurality of SRG identifiers comprises evaluating priority information associated with an SRG identifier among the plurality of SRG identifiers.

4. The method of claim 3, wherein filtering the plurality of SRG identifiers further comprises including in the smaller number of SRG identifiers the SRG identifier that the priority information is associated with only if the priority information meets a specified priority condition.

5. The method of claim 3, wherein evaluating priority information comprises considering a type of network feature associated with the SRG identifier among the plurality of SRG identifiers.

6. The method of claim 1, wherein the first network layer comprises a server layer, and the second network layer comprises a client layer.

7. An apparatus comprising:
   a network interface for connection to a communications network, wherein
      the network interface is adapted to send, to a second network layer and from a first network layer, network information comprising shared risk group (SRG) information;
   a processor coupled to the network interface and configured to execute one or more processes; and
   a memory coupled to the processor and adapted to store program instructions operable when executed to
      process, at the first network layer, first network information comprising a plurality of SRG identifiers assigned at the first network layer, wherein
         the program instructions are operable to produce second network information comprising a smaller number of SRG identifiers than that of the plurality of SRG identifiers,
         the program instructions are further operable to implement at least one of filtering the plurality of SRG identifiers or summarizing the plurality of SRG identifiers, and
         the filtering or summarizing the plurality of SRG identifiers comprises omitting from the smaller number of SRG identifiers one or more SRG identifiers corresponding to network features located along the same non-branched segment of a route within the first network layer, and
      send at least a portion of the second network information from the first network layer to the second network layer.

8. The apparatus of claim 7, wherein the second network information is adapted for processing at the second network layer to obtain one or more of the smaller number of SRG identifiers.

9. The apparatus of claim 7, wherein filtering the plurality of SRG identifiers comprises evaluating priority information associated with an SRG identifier among the plurality of SRG identifiers.

10. The apparatus of claim 9, wherein filtering the plurality of SRG identifiers further comprises including in the smaller number of SRG identifiers the SRG identifier that the priority information is associated with only if the priority information meets a specified priority condition.

11. The apparatus of claim 9, wherein evaluating priority information comprises considering a type of network feature associated with the SRG identifier among the plurality of SRG identifiers.

12. A non-transitory computer-readable storage medium configured to store program instructions that, when executed on a processor, are configured to cause the processor to perform a method comprising:

processing, at a first network layer, first network information comprising a plurality of shared risk group (SRG) identifiers assigned at the first network layer, wherein the processing comprises producing second network information comprising a smaller number of SRG identifiers than that of the plurality of SRG identifiers, the producing second network information comprises at least one of filtering the plurality of SRG identifiers or summarizing the plurality of SRG identifiers, and the filtering or summarizing the plurality of SRG identifiers comprises omitting from the smaller number of SRG identifiers one or more SRG identifiers corresponding to network features located along the same non-branched segment of a route within the first network layer; and sending at least a portion of the second network information from the first network layer to a second network layer.

13. The non-transitory computer-readable storage medium of claim 12, wherein filtering the plurality of SRG identifiers comprises evaluating priority information associated with an SRG identifier among the plurality of SRG identifiers.

14. The non-transitory computer-readable storage medium of claim 13, wherein filtering the plurality of SRG identifiers further comprises including in the smaller number of SRG identifiers the SRG identifier that the priority information is associated with only if the priority information meets a specified priority condition.

* * * * *